United States Patent
Keski-Jaskari

(10) Patent No.: US 11,789,556 B2
(45) Date of Patent: Oct. 17, 2023

(54) TOUCH DETECTION DEVICE AND METHOD

(71) Applicant: Aito BV, Amsterdam (NL)

(72) Inventor: Turo Keski-Jaskari, Tuusula (FI)

(73) Assignee: Aito BV, Amsterdam (NL)

( * ) Notice: Subject to any disclaimer, the term of this patent is extended or adjusted under 35 U.S.C. 154(b) by 9 days.

(21) Appl. No.: 17/436,699

(22) PCT Filed: Mar. 6, 2020

(86) PCT No.: PCT/EP2020/055994
§ 371 (c)(1),
(2) Date: Sep. 7, 2021

(87) PCT Pub. No.: WO2020/178423
PCT Pub. Date: Sep. 10, 2020

(65) Prior Publication Data
US 2022/0155933 A1 May 19, 2022

(30) Foreign Application Priority Data

Mar. 7, 2019 (FI) .................................... 20195169

(51) Int. Cl.
*G06F 3/041* (2006.01)
*G06F 3/01* (2006.01)

(52) U.S. Cl.
CPC .......... *G06F 3/04144* (2019.05); *G06F 3/016* (2013.01); *G06F 2203/04106* (2013.01)

(58) Field of Classification Search
None
See application file for complete search history.

(56) References Cited

U.S. PATENT DOCUMENTS

2005/0146511 A1   7/2005   Hill et al.
2012/0274599 A1   11/2012   Shediwy
(Continued)

FOREIGN PATENT DOCUMENTS

EP   2583071 A2   4/2013
EP   3137964 A1   3/2017
(Continued)

OTHER PUBLICATIONS

International Search Report and Written Opinion for PCT/EP2020/055994 (ISA/EP) dated May 18, 2020 (9 pages).
(Continued)

*Primary Examiner* — Carl Adams
(74) *Attorney, Agent, or Firm* — Alston & Bird LLP

(57) ABSTRACT

It is an object to provide a device that may detect touch. According to an embodiment, device comprises a surface comprising a first side and a second side. The device may further comprise a plurality of elements arranged on the second side of the surface. Each element in the plurality of elements may be configured to convert a mechanical stress in the element induced by a force exerted onto the first side of the surface by an object into a voltage. The device may further comprise a computing device electrically coupled to each element in the plurality of elements. The computing device may be configured to calculate a position of the object on the surface. A device, a method, and a computer program product are provided.

16 Claims, 4 Drawing Sheets

(56) References Cited

U.S. PATENT DOCUMENTS

| | | | |
|---|---|---|---|
| 2015/0022459 A1* | 1/2015 | Yliaho | G06F 3/0416 |
| | | | 345/173 |
| 2015/0091858 A1 | 4/2015 | Rosenberg et al. | |
| 2015/0309639 A1* | 10/2015 | Amarilio | G06F 3/016 |
| | | | 345/174 |
| 2017/0285810 A1 | 10/2017 | Krah | |
| 2018/0039366 A1 | 2/2018 | Colgate et al. | |

FOREIGN PATENT DOCUMENTS

| | | |
|---|---|---|
| JP | 2006-323823 A | 11/2006 |
| WO | WO-2012/154960 A2 | 11/2012 |
| WO | WO-2015/125119 A1 | 8/2015 |
| WO | WO-2015/127270 A2 | 8/2015 |

OTHER PUBLICATIONS

International Preliminary Report on Patentability for PCT/EP2020/055994 (IPEA/EP) dated May 20, 2021 (17 pages).

Search Report for Finnish Application No. 20195169 dated Jun. 20, 2019 (2 pages).

Annex of EP Patent Application No. 20710119.7, dated Mar. 13, 2023, 7 page(s).

\* cited by examiner

TOUCH DETECTION DEVICE AND METHOD

CROSS-REFERENCE TO RELATED APPLICATIONS

The present application is a national phase entry of International Application No. PCT/EP2020/055994, filed Mar. 6, 2020, which claims priority to Finnish Application No. 20195169, filed Mar. 7, 2019, which are incorporated herein by reference in their entirety.

TECHNICAL FIELD

The present disclosure relates generally to a touch user interface of a device, and more specifically to touch detection in such a device.

BACKGROUND

Touch sensitive elements, such as piezoelectric elements, may be utilized in touch-based user interfaces, such as touch screens, trackpads or various different kinds of appliances having a need to receive a touch on a surface. However, reliably determining a position of a finger of a user, for example, on such an interface may introduce various challenges. For example, a user may touch the interface with varying degrees of force, and it may be challenging to design a device that is sensitive enough to function reliably when the interface is touched only lightly while also functioning properly when a greater force is applied. Furthermore, the movement of the finger on the surface may cause challenges for the detection. Alternative touch detection schemes, such as capacitive detection may have other limitations. For example, capacitive touch detection may not function properly when the user is wearing gloves.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a device that may detect a touch. The object is achieved by the features of the independent claims. Further implementation forms are provided in the dependent claims, the description and the figures.

According to a first aspect a device comprises: a surface comprising a first side and a second side; a plurality of elements arranged on the second side of the surface, wherein each element in the plurality of elements is configured to: convert a mechanical stress in the element induced by a force exerted onto the first side of the surface by an object into a voltage, wherein the mechanical stress and the voltage comprise an impulse component and a vibrational component; and a computing device electrically coupled to each element in the plurality of elements, configured to: calculate the impulse component and the vibrational component of the voltage for each element. With such configurations, the device may be able to, for example, determine the position of the object on the surface or determine whether the object is touching the surface.

In an implementation form of the first aspect, the computing device is further configured to calculate a position of the object on the surface based on the impulse component and the vibrational component of the voltage of each element. With such configurations, the device may be able to, for example, determine the position of the object on the surface with improved accuracy and/or reliability, since the device may utilize both vibrational movement from the object and the impulse as the object applies a force onto the surface.

In a further implementation form of the first aspect, the computing device is configured to calculate the position of the object on the surface based on impulse component and the vibrational component of the voltage by calculating a weighted average of the impulse component and/or the vibrational component over the plurality of elements. With such configurations, the device may be able to, for example, efficiently determine the position of the object on the surface.

In a further implementation form of the first aspect, the plurality of elements comprises piezoelectric elements. The piezoelectric elements may be able to, for example, convert the mechanical stress into an electrical voltage with a high efficiency.

In a further implementation form of the first aspect, the computing device is further configured to calculate the impulse component by summing samples of the voltage over time. With such configurations, the computing device may be able to efficiently determine the impulse component, which may improve the accuracy of the positioning of the object on the surface.

In a further implementation form of the first aspect, a frequency of the vibrational component is in the range of 5-25 hertz. This frequency range may correspond to a vibrational frequency as a human finger touches a surface. Thus, the device may be able to, for example, efficiently determine the position of a human finger on the surface.

In a further implementation form of the first aspect, the computing device is further configured to calculate a velocity of the object on the surface. With such configurations, the device may be able to, for example, better track movements of the object on the surface.

In a further implementation form of the first aspect, the computing device is further configured to track the position of the object on the surface as the object moves. With such configurations, the device may be able to, for example, efficiently track various inputs a user gives by touching the surface.

In a further implementation form of the first aspect, the computing device is further configured to calculate a direction of the movement of the object on the surface as the object moves. With such configurations, the direction of the movement of the finger of the user may be determined.

In a further implementation form of the first aspect, the computing device is further configured to compare the impulse component and/or the vibrational component to a preconfigured threshold. With such configurations, the device may be able to, for example, ignore impulse components and/or vibrational components that are due to, for example, electrical noise.

In a further implementation form of the first aspect, the computing device is further configured to, when calculating the position of the object on the surface, weight the impulse component and the vibrational component based on a preconfigured criterion. With such configuration, the device may be able to, for example, dynamically utilize more one of the components when the other one is, for example, unreliable or inaccurate.

In a further implementation form of the first aspect, the preconfigured criterion comprises an amplitude of the impulse component. With such configuration, the device may be able to, for example, weight more the vibrational component when the impulse component is, for example, unreliable or inaccurate.

In a further implementation form of the first aspect, the computing device is further configured to: apply a driving voltage to each element of the plurality of elements; and wherein each element in the plurality of elements is further configured to: provide a haptic effect to the first side of the surface based on the driving voltage. With such configurations, the device may be able to, for example, also provide haptic feedback.

In a further implementation form of the first aspect, the computing device is configured to apply the driving voltage to the plurality of elements in such a way that the haptic effect is provided to least at the location of the object. With such configurations, the device may be able to, for example, provide haptic feedback to a finger of a user.

In a further implementation form of the first aspect, the computing device is configured to calculate the driving voltage for each element in the plurality of elements based on a distance between the element and the position of the object on the surface. With such configurations, the device may be able to, for example, localize the provided haptic feedback to the finger of the user.

In a further implementation form of the first aspect, the driving voltage is inversely proportional to a square of the distance between the element and the position of the object on the surface. With such configurations, the device may be able to, for example, efficiently localize the provided haptic feedback to the finger of the user.

In a further implementation form of the first aspect, the computing device is further configured to: receive additional information about the position of the object from a second device; and calculate a position of the object on the surface based on the impulse component of the voltage of each element, the vibrational component of the voltage of each element, and the additional information. With such configurations, the device may achieve more accurate positioning.

According to a second aspect, a method comprises: converting a mechanical stress in elements induced by a force exerted onto a first side of a surface by an object into a voltage, wherein the mechanical stress and the voltage comprise an impulse component and a vibrational component; and calculating the impulse component and the vibrational component of the voltage.

In an implementation form of the second aspect, the method further comprises: calculating a position of the object on the surface based on the impulse component and the vibrational component of the voltage.

According to a third aspect, a computer program product is provided, comprising program code configured to perform a method according to the second aspect when the computer program is executed on a computing device.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Figure 1:
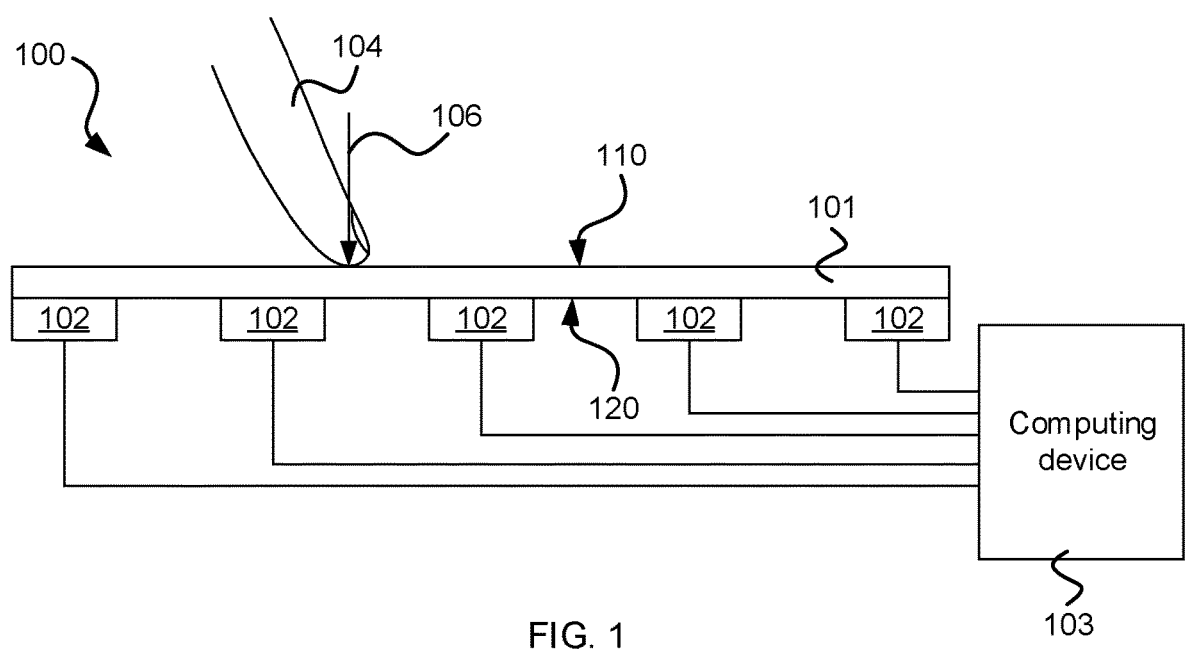
FIG. 1 illustrates a schematic representation of a cross section of a device configured to determine an impulse and a vibration of an object on a surface of the device according to an embodiment.

FIG. 1 illustrates a schematic representation of a cross section of a device 100 configured to determine an impulse and a vibration of an object 104 on a surface 101 of the device according to an embodiment.

According to an embodiment, the device 100 comprises a surface 101 comprising a first side 110 and a second side 120. The surface 101 may also be referred to as a layer, a surface layer, a touch interface surface, or a touch interface layer. The surface 101 may be part of a touch user interface. The surface 101 may be, for example, part of a trackpad of a laptop computer or a touch screen.

The device 100 may further comprise a plurality of elements 102 arranged on the second side 120 of the surface 101. For example, the elements 102 may be next to the second side 120, in a close proximity of the second side 120 or situated at a distant from the second side 120. Each element 102 in the plurality of elements may be configured to convert a mechanical stress in the element 102 induced by a force 106 exerted onto the first side 110 of the surface 101 by an object 104 into a voltage. The mechanical stress and the voltage may comprise an impulse component and a vibrational component. The mechanical stress may also be referred to as stress. The voltage may be referred to as electrical voltage, a stress induced voltage, or a corresponding voltage. The voltage may be proportional to the mechanical stress.

The elements 102 may comprise, for example, piezoelectric elements. The elements 102 may be configured to convert the mechanical stress into the voltage via the piezoelectric effect, also referred to as piezoelectricity. The object 104 may be, for example, a finger of a user, any other body part of a human, a stylus pen, or some other object held by a user. In the case that the object 104 is a finger, the user may be wearing gloves, and only the fabric of the glove may be in direct contact with the surface 101.

The term "plurality of elements" may refer to all elements comprised in the device 100 or a subset of elements comprised in the device 100. For example, the embodiment of FIG. 1, five elements 102 are presented. Thus, in this embodiment, the "plurality of elements" may comprise, for example, two, three, four, or five elements 102. Therefore, the operations presented herein may be performed for each of a subset or all of the elements 102 of the device 100.

The impulse component of the stress may correspond to, for example, an impulse, force, or pressure applied by the object 104 to the surface 101. The impulse component may also be referred to as an average stress.

The vibrational component may correspond to, for example, a vibrational motion, force, or pressure induced by the object 104 to the surface 101 and/or to the elements 102. For example, a human finger may have a tendency to slightly vibrate when pressed against a surface. Such a vibration may also exist with no or minimal applied pressure by the object 104. This may make it possible to implement the vibration based positioning also with a light touch, starting even when the outer layer of the skin or the fabric of a glove barely makes contact with the surface 101. Moreover, the frequency of the vibration may be different from the frequencies of typical noise components. This may make it easier to filter out unwanted noise and detect touch reliably.

The device may further comprise a computing device 103 electrically coupled to each element 102 in the plurality of elements. The computing device 103 may be configured to calculate the impulse component and the vibrational component of the voltage for each element and calculate a position of the object 104 on the surface 101 based on the impulse component and the vibrational component of the voltage of each element.

Although an impulse or an impulse component may refer to the mechanical impulse applied to an element 102, since the voltage may be proportional to the mechanical stress, the voltage may also comprise such an impulse component.

Although a vibrational component may refer to the mechanical vibration of an element 102, since the voltage may be proportional to the mechanical stress, the voltage may also comprise such a vibrational component.

The impulse component may correspond to a total impulse applied to an element 102. The vibrational component may correspond to a vibration induced into an element 102.

As the object 104 exerts the force 106 onto the surface 101, the force 106 may induce mechanical stress in the elements 102 as the surface 101 distributes the force 106 between the elements 102. The stress induced in an element 102 may be inversely proportional to the distance between the element 102 and the object 104.

The computing device 103 may further comprise, for example, a voltage booster circuit, a microprocessor, and other components used to interact with the elements 102. The voltage booster may provide a high voltage that may be needed to drive the elements 102 in the case of haptic feedback. The microprocessor may perform addressing of the elements 102.

The computing device 103 may comprise at least one processor. The at least one processor may comprise, for example, one or more of various processing devices, such as a co-processor, a microprocessor, a computing device 103, a digital signal processor (DSP), a processing circuitry with or without an accompanying DSP, or various other processing devices including integrated circuits such as, for example, an application specific integrated circuit (ASIC), a field programmable gate array (FPGA), a microprocessor unit (MCU), a hardware accelerator, a special-purpose computer chip, or the like.

The computing device 103 may further comprise a memory. The memory may be configured to store, for example, computer programs and the like. The memory may comprise one or more volatile memory devices, one or more non-volatile memory devices, and/or a combination of one or more volatile memory devices and non-volatile memory devices. For example, the memory may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

When the computing device 103 is configured to implement some functionality, some component and/or components of the computing device 103, such as the at least one processor and/or the memory, may be configured to implement this functionality. Furthermore, when the at least one processor is configured to implement some functionality, this functionality may be implemented using program code comprised, for example, in the memory.

Although in the embodiment of FIG. 1, only one object 104 is illustrated, there may be a plurality of objects 104 touching the surface 101 at the same time. Any embodiment of the device 100 described herein may be configured to locate the position of each object of a plurality of objects 104 on the surface. The positioning of each object 104 may be performed as described herein.

Figure 2:
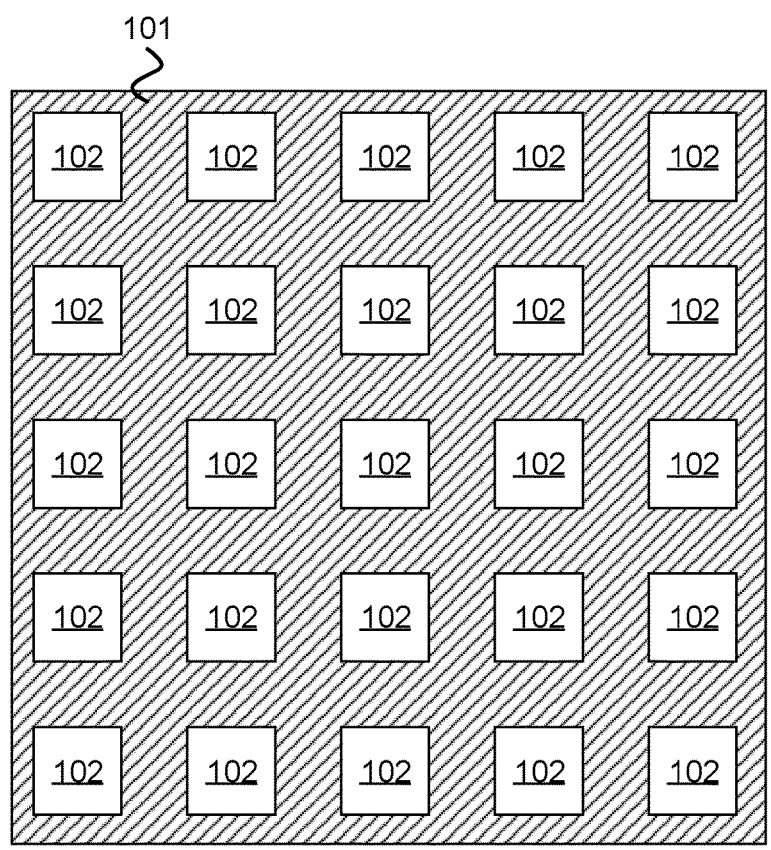
FIG. 2 illustrates a schematic representation of a plurality of elements configured to convert mechanical stress into a voltage according to an embodiment.

FIG. 2 illustrates a schematic representation of a plurality of elements 102 configured to convert mechanical stress into a voltage. The embodiment of FIG. 2 may be a top or a bottom view of the elements 102. This may correspond to the side view illustrated in the embodiment of FIG. 1. The surface 101 is also illustrated on top of/below the elements 102 in the embodiment of FIG. 2.

The elements 102 may be physically arranged into a matrix, for example, in the plane of the surface 101. An example of such a matrix is illustrated in the embodiment of FIG. 2. However, the elements 102 may also be arranged in various other ways, for example by an oval, circle, or even other non-regular shape. For example, the elements 102 may be arranged into a substantially circular formation to the edges of the surface 101. The physical arrangement of the elements 102 may not correspond to the electrical arrangement/topology of the elements 102.

Figure 3:
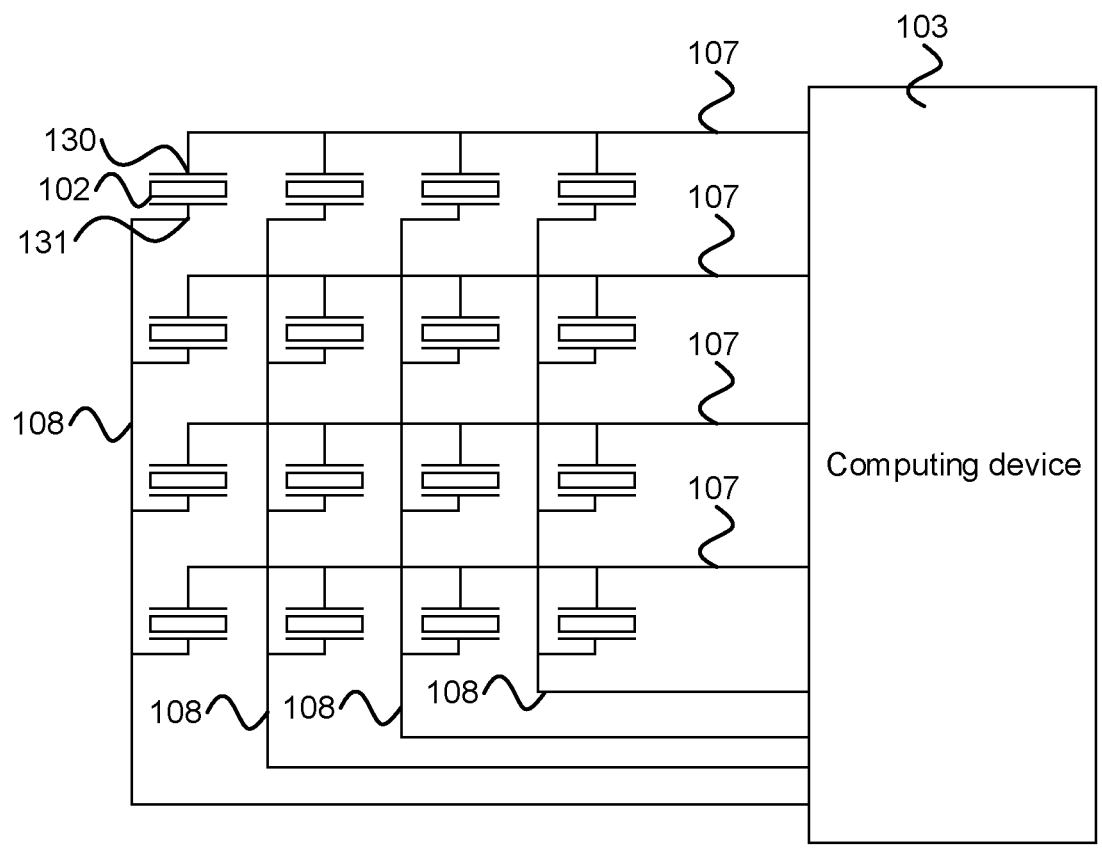
FIG. 3 illustrates a schematic representation of electrical coupling between the plurality of elements and the computing device according to an embodiment.

FIG. 3 illustrates a schematic representation of electrical coupling between the plurality of elements 102 and the computing device 103. It should be appreciated that the embodiment of FIG. 3 is only exemplary, and the elements 102 may be coupled to the computing device 103 in various ways.

The elements 102 may be arranged into rows 107 and columns 108 in the plurality of elements 102. Each row may comprise a row conductor, and each column may comprise a column conductor. Each element in a row 107 may be electrically coupled to the corresponding row conductor, and each element in a column 108 may be electrically coupled to the corresponding column conductor.

Each element 102 may comprise two terminals 130, 131. One terminal 130 may be connected to a row conductor and one terminal 131 may be connected to a column conductor. When a stress is applied to an element 102, a voltage may be detected between the terminals 130, 131. Thus, the computing device 103 may detect the voltage via the corresponding row and column conductors 107, 108, and the computing device 103 may determine which element 102 is actuated based on the column and row.

When a voltage is applied between the row conductor and the column conductor, the element 102 that is connected to the row 107 and the column 108 may provide haptic effect via, for example, the piezoelectric effect.

A row may refer to elements 102 that are electrically coupled to a certain row and/or to the corresponding row conductor. A column may refer to elements 102 that are electrically coupled to a certain row and/or to the corresponding column conductor.

The rows 107 and columns 108 may only refer to the electrical arrangement of the elements 102. The elements 102 may be arranged spatially into many different arrangements that may differ from the electrical arrangement. Furthermore, even if the elements 102 are arranged spatially into a matrix, this spatial arrangement does not necessarily correspond to the electrical arrangement in the plurality of elements 102. For example, two spatially neighboring elements 102 may not be neighboring in the electrical arrangement of the plurality of elements 102.

Each element 102 may be addressed by applying a voltage to the corresponding row 107 and column 108. For example, the top left element 102 presented in FIG. 3 may be addressed by applying a voltage between the top row conductor 107 and the left most column conductor 108. Such addressing may decrease the amount of needed electronics hardware, such as piezo drivers, channel selectors, and physical wires between the computing device 103 and the elements 102, compared to other arrangements.

Although some functionality of the device 100 may be disclosed using row and column, these should not be considered limiting. For example, functionality of the rows and columns may be interchanged without losing the effect sought.

The embodiment of FIG. 3 is only an example, and the elements 102 may be coupled to computing device 103 in various ways. For example, the elements 102 be electrically arranged into a non-matrix arrangement. For example, one of the terminals 130, 131 of the elements 102 can be connected to a steady reference voltage, while other terminal 130, 131 of each element 102 may be connected to the computing device 103 separately. In such a configuration, the computing device 103 may detect a voltage between the terminal connected to the computing device 103 and the terminal connected to the reference voltage.

The user may also perceive the haptic effect as a feedback, i.e. haptic feedback for example after touching or pressing a button or a key. Alternative or in addition to the above, the device 100 may output the haptic effect without a user interaction or a feedback, for example by another kind of actuation.

According to an embodiment, the elements 102 in the plurality of elements 102 comprise piezoelectric elements.

The computing device 103 may comprise analog-to-digital converters (ADCs) that may be configured to convert an analog voltage from the elements 102 to a digital signal. Based on the row 107 and the column 108, the computing device 103 can detect which element 102 was pressed.

There can be several elements 102 touched, pressed, swiped, or otherwise actuated by the user at the same time, providing large enough signal differences on several pairs of rows 107 and columns 108, which can be detected and recognized in the computing device 103. Different and adjustable sensitivity thresholds can be used for recognition of different kind of touch events in the computing device 103.

The computing device 103 may be further configured to utilize also relative information from the elements 102 to record also movements of finger(s), pressure profiles, etc. Based on the detected signals, the computing device 103 may drive the elements 102, as disclosed herein, to provide haptic experiences for the user.

According to an embodiment, the computing device 103 is configured to calculate the position of the object 104 on the surface 101 based on impulse component and the vibrational component of the voltage by calculating a weighted average of the impulse component and/or the vibrational component over the elements. Alternatively, the computing device 103 may be configured to transmit the impulse component and the vibrational component of the voltage of each element to a second device, wherein the second device is configured to calculate the position of the object on the surface based on the impulse component and the vibrational component of the voltage of each element. The second device may be, for example, a so-called host device.

According to an embodiment, the computing device 103 is configured to determine whether the object 104 is touching the surface 101 based on impulse component and the vibrational component of the voltage by calculating a weighted average of the impulse component and/or the vibrational component over the elements.

According to an embodiment, the computing device 103 is further configured to receive additional information about the position of the object from a second device and calculate a position of the object on the surface based on the impulse component of the voltage of each element, the vibrational component of the voltage of each element, and the additional information. For example, the second device may comprise a capacitive sensing device. The capacitive sensing device may be configured to determine the position of the object 104 on the surface 101 based on capacitive sensing. In some cases, such capacitive sensing can be reliable and could be used as a third weighted item by the computing device 103 in addition to impulse component and vibrational component. When the computing device 103 detects a strong impulse signal and low capacitive signal, the computing device may weight more the impulse component and the vibrational component.

Figure 4:
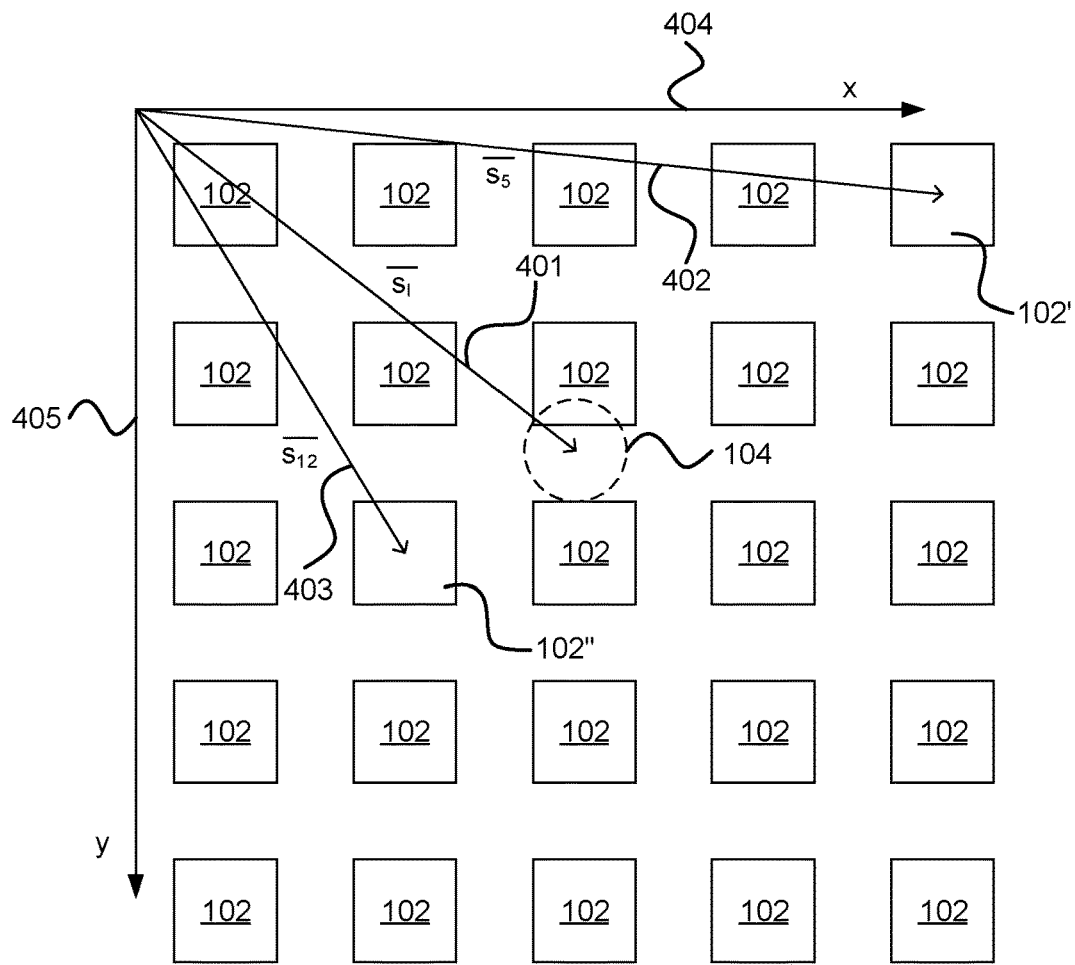
FIG. 4 illustrates a schematic representation of position vectors according to an embodiment.

FIG. 4 illustrates a schematic representation of position vectors according to an embodiment. In the embodiment of FIG. 4, a position vector $\bar{s}_I$ 401 of the object 104 on the surface 101 is presented. Furthermore, two position vectors $\bar{s}_5$ 402 and $\bar{s}_{12}$ 403 of two elements 102' and 102" of the plurality of elements 102 are presented. A similar position vector $\bar{s}_i$ may be assigned for each element 102 in the plurality of elements 102. In the embodiment of FIG. 4, only two such position vectors are presented for clarity purposes.

The device 101 may calculate the position of the object 104 using, for example, coordinates. The coordinates may be, for example, Cartesian coordinates or polar coordinates. For example, in the embodiment of FIG. 4, the position vectors $\bar{s}_5$ 402 and $\bar{s}_{12}$ 403 may be expressed as:

$$\bar{s}_5 = 5\bar{e}_x + \bar{e}_y,$$

$$\bar{s}_{12} = 2\bar{e}_x + 3\bar{e}_y,$$

where $\bar{e}_x$ is a unit vector in the x-direction 404 and $\bar{e}_y$ is a unit vector in the y-direction. Therefore, coordinates of the element 102' may be (5, 1) and coordinates of the element 102" may be (2, 3). The position vector may be expressed as $$\bar{s}_I = 3\bar{e}_x + 2.4\bar{e}_y.$$

The coordinates of the object 104 may therefore be (3, 2.4). All of these values are only examples, and the coordinates may be expressed in various other ways. For example, the coordinates may be normalized to be between 0 and 1, and/or the x-direction and/or the y-direction may vary.

The computing device 103 may be further configured to output/report the coordinates to another device, such as a host device, or component.

The computing device 103 may calculate the position vector $\bar{s}_I$ 401 of the object 104 using, for example, a weighted average, such as:

$$\bar{s}_I = \frac{\sum_i I_i \bar{s}_i}{\sum_i F_i},$$

where $I_i$ is the impulse component at element i. The impulse component $I_i$ may be calculated, for example, by integrating a force/stress applied to an element 102 with respect to time. Alternatively, the impulse component $I_i$ may be replaced with, for example, force, pressure, stress, or a voltage induced in the element by a force, a stress, or a pressure.

The computing device 103 may calculate a similar position vector $\bar{s}_V$ of the object 104 based on the vibrational component in each element:

$$\bar{s}_v = \frac{\sum_i v_i \bar{s}_i}{\sum_i v_i},$$

where $v_i$ is the vibrational component in element i. $v_i$ may comprise, for example, amplitude of the vibration or amplitude of the voltage induced by the vibration.

The computing device 103 may combine the position calculated based on the impulse component and the position calculated based on the vibrational component by, for example, taking the average of these two position vectors. The estimated position vector $\bar{s}$ of the object 104 may then be, for example:

$$\bar{s} = \frac{\bar{s}_v + \bar{s}_I}{2}.$$

Alternatively, the two position vectors $\bar{s}_V$, $\bar{s}_I$ may be weighted differently or otherwise. For example, there may be a weight $\alpha_V$ for and a weight $\alpha_I$ for $\bar{s}_I$:

$$\bar{s} = \alpha_v \bar{s}_v + \alpha_I \bar{s}_I,$$

where $\alpha_V + \alpha_I = 1$. The weights $\alpha_V$, $\alpha_I$ may be functions of $v_i$ and/or $I_i$. For example, the computing device 103 may be configured to weight more $\bar{s}_V$ by increasing the value of $a_V$ compared to $\alpha_I$ when the object 104 only lightly touches the surface 101. Such a light touch may be detected from small $I_i$ values. The computing device 103 may be configured to adjust $\alpha_V$ and $\alpha_I$ as impulse to the elements increases. The computing device 103 may even adjust the weights $\alpha_V$, $\alpha_I$ as a function of time. For example, if the object 104 first only applies a small force 106 to the surface 101, the computing device 103 may configure $\alpha_V$ to be large compared to $\alpha_I$, and if the force increases over time, $\alpha_I$ may increase and $\alpha_V$ may decrease over time. The computing device 103 may be configured to adjust the weights according to the condition $\alpha_V + \alpha_I = 1$.

According to an embodiment, the computing device 103 is further configured to, when calculating the position of the object on the surface, weight the impulse component and the vibrational component based on a preconfigured criterion.

The preconfigured criterion may comprise, for example, an amplitude of the impulse component. The computing device 103 may calculate the amplitude of the impulse component by, for example, averaging $I_i$ over the elements 102. If the amplitude of the impulse component is small, the computing device 103 may weight more the vibrational component, for example as described above.

The preconfigured criterion may comprise an external condition. For example, the computing device 103 may recognize a disturbance that could affect the vibrational component. In such a situation, the computing device 103 may weight the impulse component more or vice-versa. Alternatively or additionally, the computing device 103 may detect an additional impulse to be caused by something else than the tracked finger and therefore weight vibrational component more.

Figure 5:
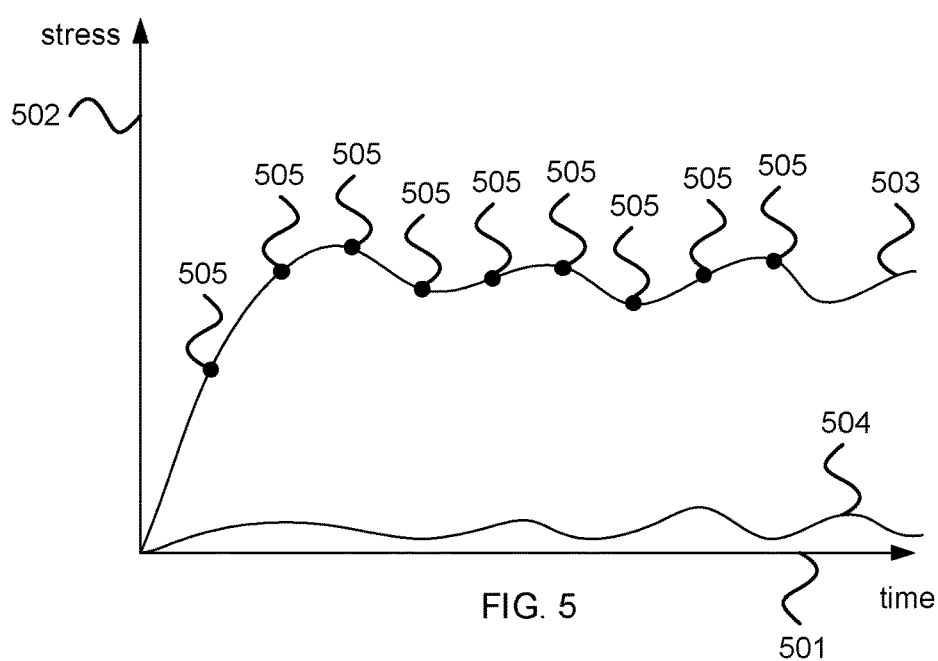
FIG. 5 illustrates a schematic representation of stress curves according to an embodiment.

FIG. 5 illustrates a schematic representation of a stress 502 in an element 102 as a function of time 501 according to an embodiment. In the embodiment of FIG. 5, two stress curves 503, 504 are illustrated.

In the case of curve 503, the force applied by the object 104 may be larger than in the case of curve 504. Alternatively or additionally, the element 102 corresponding to curve 504 may be further away from the object 104 than the element 102 corresponding to curve 503.

As the object 104 starts to press onto the surface 101, the stress increases as illustrated by the curves 503, 504. At later time instances, the stress may be substantially constant, and the vibrational component of the stress may be prominent.

The computing device 103 may sample the stress 503 at substantially constant time intervals, producing samples $\sigma_i$ 505 of the stress. Alternatively, the samples may comprise corresponding voltage values, if the elements 102 are configured to convert the stress into a voltage. Herein, the stress and voltage may be used interchangeably. The computing device 103 may calculate an average stress $\sigma_{ave}$ using, for example:

$$\sigma_{ave} = \frac{1}{N} \sum_i \sigma_i,$$

where N is the number of samples used for calculating the average. It may be beneficial to ignore strain samples $\sigma_i$ during the time when the strain changes as the object 104 starts to press onto the surface 101.

According to an embodiment, the computing device 103 is further configured to calculate the impulse component by summing samples of the voltage over time.

The computing device 103 may calculate an impulse component applied to an element 102 by integrating the stress over time, since the stress may be proportional to the force applied to the element. Since the computing device 103 may obtain discrete samples $\sigma_i$ of the stress, the impulse may be calculated using a sum over the stress samples $\sigma_i$:

$$I = \int_T F dt = \int_T \sigma S \, dt \approx \frac{S}{f_T} \sum_i \sigma_i,$$

where T is the time interval for which the impulse is calculated for, S is the surface area of the element 102 and $f_T$ is the sampling frequency of the stress samples $\sigma_i$. Alternatively, the computing device 103 may use other procedures, such as Simpson's rule or the trapezoidal rule, to calculate the impulse component I from the samples $\sigma_i$.

The computing device 103 may ignore the $S/f_t$ factor in the equation above, since actual value of the impulse I may not be of interest. For example, the computing device 103 may calculate the position of the object 104 based on the relative magnitude of the impulse components of different elements 102, such as with the weighted average described above.

Since the impulse component applied to an element 102 may be inversely proportional to the distance between the element 102 and the object 104, the computing device 103 may use the impulse component of each element 102 to calculate/estimate the position of the object 104 on the surface 101.

For each sample $\sigma_i$, the computing device 103 may calculate a vibration amplitude $A_i$ using, for example:

$$A_i = |\sigma_i - \sigma_{ave}|.$$

The computing device 103 may calculate an average vibration amplitude $A_{ave}$ using, for example:

$$A_{ave} = \frac{1}{N}\sum_i A_i,$$

or $$A_{ave} = \frac{1}{N}\sum_i A_i^2.$$

The average vibration amplitude $A_{ave}$ may quantify the amount of vibration in an element 102. The vibrational component may comprise the average vibration amplitude $A_{ave}$. The average vibrational amplitude $A_{ave}$ may also be referred to as the variance of the samples $\sigma_i$. Since the amount of vibration in an element 102 may be inversely proportional to the distance between the element 102 and the object 104, the computing device 103 may use the vibrational component of each element 102 to calculate/estimate the position of the object 104 on the surface 101.

According to an embodiment, the computing device 103 is further configured to compare the impulse component and/or the vibrational component to a preconfigured threshold. This may enable the computing device 103 to ignore voltages that may be due to, for example, electrical noise.

According to an embodiment, a frequency of the vibrational component is in the range 5-25 hertz (Hz). The frequency may be in any subrange of this, such as, 10-20 Hz, 12-18 Hz, or 13-17 Hz. The computing device 103 may be configured to substantially filter out frequencies outside this range.

As a person skilled in the art can appreciate, even though the calculations above are presented with respect to stresses applied to the elements 102, the computing device 103 may be configured to perform corresponding calculations using voltage samples obtained from the elements 102. The elements 102 may be configured to convert the stress into a voltage. Thus, in the discussion above, the term "stress" may be replaced with the term "voltage". The voltage samples may be proportional to the stress applied to the element 102. The computing device 103 may, for example, scale the voltage samples by a scaling factor. In some embodiments, such scaling factor may not be needed, since the exact value of the stress/impulse may not be of interest. Instead, the computing device 103 may utilize the corresponding voltage samples as such.

According to an embodiment, the computing device 103 is further configured to calculate a velocity of the object on the surface. The computing device 103 may be configured to predict a future position of the object 104 on the surface 101 based on the velocity. The computing device 103 may combine such a prediction with other calculations/measurement disclosed herein to estimate the position of the object 104 on the surface 101.

According to an embodiment, the computing device 103 is further configured to track the position of the object on the surface 101 as the object 104 moves. For example, the computing device 103 may be configured to record a starting position and an end position. The starting position may correspond to a position where the object 104 starts to touch the surface 101, and the end position may correspond to a position where the object 104 stops touching the surface 101. The computing device 103 may also be configured to output/report the starting position and/or the end position to another device or component.

According to an embodiment, the computing device 103 is further configured to apply a driving voltage to each element 102 of the plurality of elements; and each element 102 in the plurality of elements is further configured to: provide a haptic effect to the first side 110 of the surface 101 based on the driving voltage. Thus, the device 100 may be able to provide haptic feedback to the object 104.

According to a further embodiment, the computing device 103 is configured to apply the driving voltage to the plurality of elements in such a way that the haptic effect is provided to least at the location of the object 104.

According to a further embodiment, the computing device 103 is configured to calculate the driving voltage for each element in the plurality of elements based on a distance between the element and the position of the object on the surface.

According to a further embodiment, the computing device 103 is configured to calculate the driving voltage for each element 102 in the plurality of elements based on the impulse component of that element. Thus, the haptic effect may be proportional to the force 106 applied to the surface 101. The computing device 103 may also be configured to record the impulse component/force of each element 102. According to a further embodiment, the driving voltage is inversely proportional to a square of the distance between the element 102 and the position of the object 104 on the surface.

The computing device 103 may also be configured to detect whether the object 104 is used by a human. If the object 104 is not used by a human, the vibrational component may be substantially zero, while the object 104 may still apply a force to the surface 101 and therefore the impulse component may be non-zero. Even if the user uses a stylus or some other object to touch the surface 101, the vibrations from the user's hand may still be detected in the vibrational component. This may be used to ignore touches that are not intended by the user.

The computing device 103 may be further configured to report/output any value to another device or component.

Figure 6:
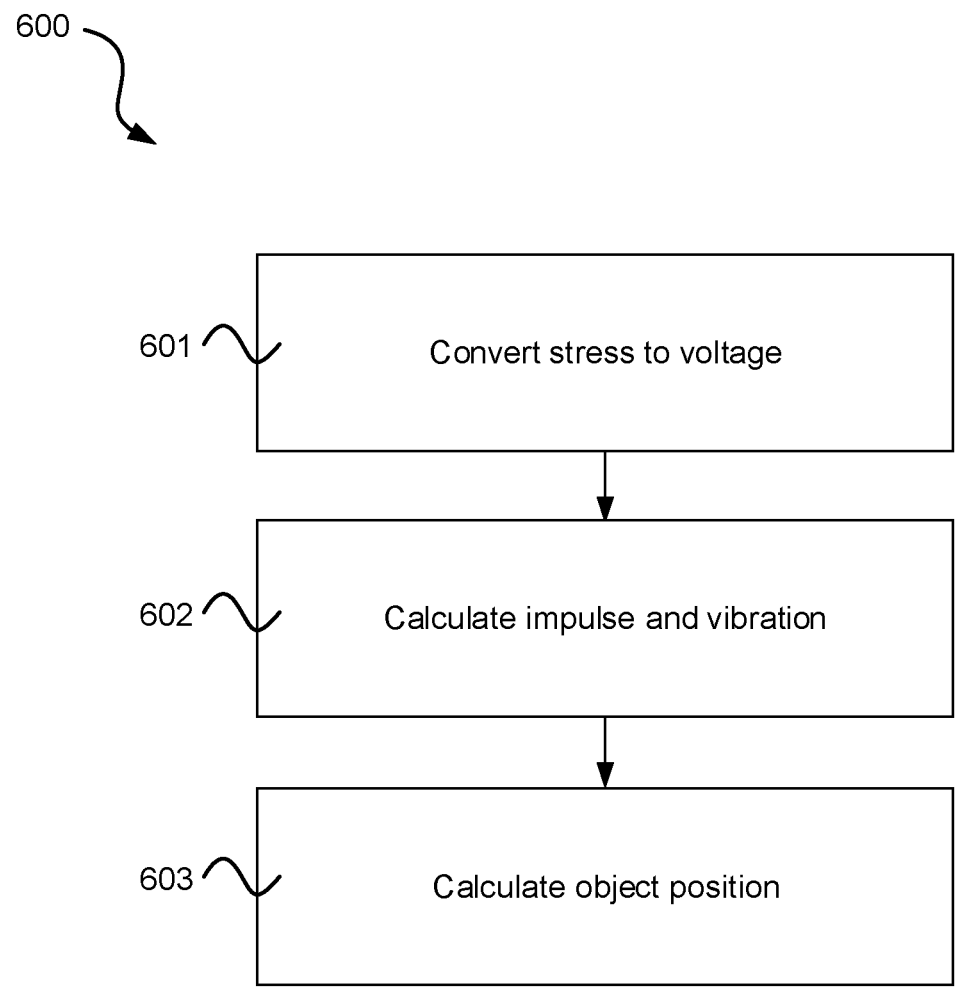
FIG. 6 illustrates a flow-chart representation of a method according to an embodiment.

FIG. 6 illustrates a flowchart representation of a method 600 according to an embodiment. The method 600 may comprise converting 601 a mechanical stress in an element induced by a force exerted onto a first side of a surface by an object into a voltage, wherein the mechanical stress and the voltage comprise an impulse component and a vibrational component.

The method 600 may further comprise calculating 602 the impulse component and the vibrational component of the voltage.

The method 600 may further comprise calculating 603 a position of the object on the surface based on the impulse component and the vibrational component of the voltage.

Although the flowchart representation of the method 600 in the embodiment of FIG. 6 may indicate a certain order for the steps 601-603 of the method 600, the steps 601-603 may be performed in any order. Furthermore, one or more of the steps 601-603 may be performed substantially simultaneously.

The device 100 and/or the method 600 may be utilized in, for example, laptop trackpads. The plurality of elements 102 may be configured to determine a force threshold and provide a tactile (click) confirmation. When a mechanical click function is replaced with the plurality of elements 102, thickness of the trackpad stack may be reduced and it may be possible to provide a more precise and uniform click sensation. "Uniform" may mean that the click sensation is similar no matter where the finger touches on the surface. The plurality of elements 102 may enable new functionalities, for instance providing a tactile sensation on the trackpad when the computer cursor moves across a virtual button on a screen. The force sensitivity on the trackpad surface may also offer new possibilities. For example, pressing harder with a finger could trigger certain functions on the computer (like shortcut functions).

The device 100 and/or the method 600 may also be utilized in, for example, vehicles, such as cars. The device 100 and/or the method 600 may enable a user/driver of a vehicle to control various systems, such as information systems, entertainment systems, and/or control systems, of the vehicle.

The device 100 and/or the method 600 may also be utilized in, for example, creating a full qwerty (laptop) keyboard, replacing the mechanical keys. This may provide at least some of the following benefits: save space (thinner stack=thinner laptop), increased robustness, seamless, closed surface may be easy to clean, new design options—material choices, new functionality and faster typing speed, (for example, select caps letter by applying more pressure with finger on a key), fully configurable—the user can change the way the keys feel (more or less "key travel", sensitivity, audio sound from keys).

When the device 100 and/or the method 600 is combined a screen/display, it may be possible to create a virtual on-screen keyboard without compromising the tactile feeling/feedback. The benefit of virtual keyboard may be that the layout of the keys (position and function) may be easily reconfigurable for example when changing between languages or certain applications (text editing vs gaming for example).

In some embodiments, one element 102 may correspond to one key on a keyboard. This may require, for example, up to 100 haptic feedback elements 101 for a full qwerty keyboard. Each element may need to be wired/connected to the computing device 103. With so many individual elements 102, the plurality of elements 102 may reduce the number of connectors and complexity of wiring.

In some embodiments, each element 102 may not correspond to a key on a keyboard. Instead, the elements 102 may be used to detect the position of the object 104, such as a finger, and based on the position, the pressed key may be deduced. Similarly, haptic feedback may be provided by the elements 102 to the position of the object 104.

The device 100 and/or the method 600 may also be utilized in combination with a display. It may also be possible to create more tactile experiences, for instance feeling textures, ridges or other structures while moving a finger across the surface/display.

In some embodiments, the elements 102 may not be discrete elements. Instead, it may also be possible to deposit piezoelectric material on a carrier material and utilize such a layer of piezoelectric material in the plurality of elements 102. This may reduce costs and make assembly easier.

The functionality described herein can be performed, at least in part, by one or more computer program product components such as software components. According to an embodiment, the device comprises a processor, such as a microprocessor, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (CPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
   a surface comprising a first side and a second side;
   a plurality of elements arranged on the second side of the surface, wherein the plurality of elements comprises piezoelectric elements, and wherein each element in the plurality of elements is configured to:

convert a mechanical stress in the element induced by a force exerted onto the first side of the surface by an object into a voltage, wherein the mechanical stress and the voltage comprise an impulse component and a vibrational component; and a computing device electrically coupled to each element in the plurality of elements, configured to:

calculate the impulse component and the vibrational component of the voltage for each element, wherein the impulse component corresponds to a total impulse applied to an element;

calculate a position of the object on the surface based on the impulse component and the vibrational component of the voltage of each element; and when calculating the position of the object on the surface, weight the impulse component and the vibrational component based on a preconfigured criterion.

2. The device according to claim 1, wherein the computing device is configured to calculate the position of the object on the surface based on impulse component and the vibrational component of the voltage by calculating a weighted average of the impulse component and/or the vibrational component over the plurality of elements.

3. The device according to claim 1, wherein the computing device is further configured to calculate the impulse component by summing samples of the voltage over time.

4. The device according to claim 1, wherein a frequency of the vibrational component is in a range of 5-25 hertz.

5. The device according to claim 1, wherein the computing device is further configured to calculate a velocity of the object on the surface.

6. The device according to claim 1, wherein the computing device is further configured to track the position of the object on the surface as the object moves.

7. The device according to claim 1, wherein the computing device is further configured to calculate a direction of the movement of the object on the surface as the object moves.

8. The device according to claim 1, wherein the computing device is further configured to compare the impulse component and/or the vibrational component to a preconfigured threshold.

9. The device according to claim 1, wherein the preconfigured criterion comprises an amplitude of the impulse component.

10. The device according to claim 1, wherein the computing device is further configured to:
apply a driving voltage to each element of the plurality of elements;
and wherein each element in the plurality of elements is further configured to:
provide a haptic effect to the first side of the surface based on the driving voltage.

11. The device according to claim 10, wherein the computing device is configured to apply the driving voltage to the plurality of elements in such a way that the haptic effect is provided to at least the location of the object.

12. The device according to claim 11, wherein the computing device is configured to calculate the driving voltage for each element in the plurality of elements based on a distance between the element and the position of the object on the surface.

13. The device according to claim 12, wherein the driving voltage is inversely proportional to a square of the distance between the element and the position of the object on the surface.

14. The device according to claim 1, wherein the computing device is further configured to:
receive additional information about the position of the object from a second device; and
calculate a position of the object on the surface based on the impulse component of the voltage of each element, the vibrational component of the voltage of each element, and the additional information.

15. A method, comprising:
converting a mechanical stress in elements induced by a force exerted onto a first side of a surface by an object into a voltage, wherein the elements comprise piezoelectric elements, and wherein the mechanical stress and the voltage comprise an impulse component and a vibrational component;
calculating the impulse component and the vibrational component of the voltage, wherein the impulse component corresponds to a total impulse applied to an element;
calculating a position of the object on the surface based on the impulse component and the vibrational component of the voltage; and
when calculating the position of the object on the surface, weighting the impulse component and the vibrational component based on a preconfigured criterion.

16. A computer program product comprising program code configured to perform the method according to claim 15 when the computer program is executed on a computing device.

* * * * *

UNITED STATES PATENT AND TRADEMARK OFFICE
CERTIFICATE OF CORRECTION

| | |
|---|---|
| PATENT NO. | : 11,789,556 B2 |
| APPLICATION NO. | : 17/436699 |
| DATED | : October 17, 2023 |
| INVENTOR(S) | : Keski-Jaskari |

It is certified that error appears in the above-identified patent and that said Letters Patent is hereby corrected as shown below:

On the Title Page

Item (30), Foreign Application Priority Data, should read:
--(30) Foreign Application Priority Data
Mar. 7, 2019 (FI) .............................. 20195169--.

Signed and Sealed this
Twelfth Day of March, 2024

Katherine Kelly Vidal
*Director of the United States Patent and Trademark Office*